United States Patent [19]

Nishikawa et al.

[11] Patent Number: 4,959,958
[45] Date of Patent: Oct. 2, 1990

[54] HYDRAULIC PRESSURE SYSTEM

[75] Inventors: Masao Nishikawa, Tokyo; Masato Hirose; Masaru Ozawa, both of Saitama, all of Japan

[73] Assignee: Honda Giken Kogyo Kabushiki Kaisha, Tokyo, Japan

[21] Appl. No.: 289,930

[22] Filed: Dec. 23, 1988

[30] Foreign Application Priority Data

| Dec. 30, 1987 | [JP] | Japan | 62-332721 |
| Dec. 30, 1987 | [JP] | Japan | 62-332728 |
| Dec. 30, 1987 | [JP] | Japan | 62-332729 |
| Dec. 30, 1987 | [JP] | Japan | 62-332730 |

[51] Int. Cl.$^5$ .................................... F16D 31/02
[52] U.S. Cl. .................................... 60/415; 901/22; 901/28; 92/118; 92/66; 60/721; 138/30
[58] Field of Search ............ 60/415; 901/22, 27, 901/28; 138/26, 27, 28, 30; 92/66, 67, 118, 119

[56] References Cited

U.S. PATENT DOCUMENTS

| 2,339,086 | 1/1944 | Makaroff | 60/415 |
| 3,536,102 | 10/1970 | Allewitz et al. | 138/30 |
| 3,665,967 | 5/1972 | Kachnik | 138/30 |
| 3,766,992 | 10/1973 | Tiraspolsky et al. | 138/30 |
| 4,428,401 | 1/1984 | Chun | 901/22 |
| 4,441,854 | 4/1984 | Di Matteo et al. | |
| 4,631,918 | 12/1986 | Rosman | 60/415 |
| 4,649,704 | 3/1987 | Marsh | 60/415 |
| 4,785,956 | 11/1988 | Kepler et al. | 138/30 |

FOREIGN PATENT DOCUMENTS

| 3817487 | 12/1988 | Fed. Rep. of Germany | 901/22 |
| 57-37101 | 3/1982 | Japan | |

Primary Examiner—Edward K. Look
Assistant Examiner—Thomas Denion
Attorney, Agent, or Firm—Lyon & Lyon

[57] ABSTRACT

A hydraulic pressure system for supplying a fluid under pressure includes a fluid pressure source for supplying the fluid pressure, an accumulator for storing part of the fluid from the fluid pressure source, the accumulator having a gas chamber filled with a high-pressure gas for pressurizing the stored fluid, and a structural member having a hermetically sealed space held in fluid communication with the gas chamber. The structural member comprises a link of an articulated mechanism interconnecting articulations, the link comprising a high polymer composite material and a metal material and having smaller-diameter portions joined to the articulations, respectively. The composite material comprises a prepreg which is either woven of weft threads extending parallel to an axis of the link and warp threads extending perpendicularly to the axis of the link, or woven of weft threads and warp threads which are inclined at about 54.75° with respect to the axis of the link.

5 Claims, 4 Drawing Sheets

HYDRAULIC PRESSURE SYSTEM

BACKGROUND OF THE INVENTION

1. Field of the Invention

The present invention relates to a hydraulic pressure system, and more particularly to a hydraulic pressure system including an accumulator having improved pressure characteristics and an articulated mechanism having a link or an arm serving as a high-pressure container made up of a composite material.

2. Description of the Prior Art

Accumulators are widely employed in hydraulic pressure systems for the purpose of saving energy or lowering vibration. As shown in FIG. 3 of the accompanying drawings, an accumulator 3 is connected to an oil supply passage interconnecting an oil pressure pump 1 and an actuator 2. When the amount of oil consumed by the actuator 2 exceeds the amount of oil supplied by the pump 1, the accumulator 3 supplies assistive oil pressure to the actuator 21, thus allowing the capacity of the pump 1 to be reduced and saving oil pressure energy. The accumulator 3, which is shown as being of the bladder type, has a pressure-resistant container 6 and a rubber bag 4 disposed in the container 6 and filled up with a high-pressure gas. When the oil pressure for operating the actuator 2 is higher than the pressure of the filled gas in the bag 4, working oil supplied from the pump 1 is stored in a space 5 defined between the container 6 and the bag 4 while compressing the gas in the bag 4 to reduce the volume of the gas. When the capacity of the pump 1 to supply oil pressure becomes insufficient, the stored oil pressure energy is discharged from the accumulator 3 to ensure smooth operation of the actuator 2. One example of such accumulator 3 is disclosed in Japanese Laid-Open Patent Publication No. 57-37101, for example.

The relationship between the volume and pressure of the stored working oil is governed by the Boyle's law and the Charles' law such that the pressure is in inverse proportion to the volume of the gas chamber defined by the bag 4. FIG. 4 of the accompanying drawings shows the relationship between the volume and pressure of stored working oil. The solid-line curve in FIG. 4 shows the pressure vs. volume characteristics of an accumulator having a relatively small capacity, indicating that the pressure P rapidly increases as the volume V of the stored oil increases. In determining the maximum capability of a hydraulic system, it is ideal that the rate of flow of supplied oil and the pressure thereof be given minimum settings. If the oil pressure supplied from an accumulator used as an assistive oil pressure source in the hydraulic system varies, then various problems occur. First, when the oil pressure from the accumulator is higher, the pump performs more work than necessary, resulting in uneconomical operation. Secondly, when the oil pressure from the accumulator is higher, more oil flows through the opening of a control valve to the actuator, so that control may be not reliable. Thirdly, the hydraulic system has to be of more mechanical strength than required to provide against higher accumulator pressures.

To eliminate the above shortcomings, it has been customary to employ an accumulator of a relatively large capacity to keep the pressure constant without variations even when the volume of the stored working fluid or oil is increased, as indicated by the broken line in FIG. 4. More specifically, the oil pressure Po from the accumulator is set to So' rather than So with respect to the volume Vo of the stored oil. The accumulator has a pressure-resistant container having a large wall thickness and made of an iron-base material having a large mechanical strength. The larger the accumulator, therefore, the heavier and the bulkier the accumulator when it is incorporated in a hydraulic pressure system. Another drawback with accumulators of the bladder type is that a gas cannot be kept in a rubber bag for a long period of time and tends to pass through the membrane or bag wall into the working oil contained in the oil chamber of the accumulator. The larger the accumulator, the greater the bag, i.e., the greater the surface area of the bag, allowing more gas to pass through the bag.

A variety of articulated mechanisms such as industrial robots for use in factories have been proposed in recent years. One such articulated mechanism is disclosed in Japanese Laid-Open Patent Publication No. 52-69152, for example.

The articulated mechanism employ many lightweight materials to reduce the inertial efficiency of articulated arms for allowing higher-speed operation. The most popular lightweight material for use in the articulated mechanisms is a fiber-reinforced synthetic resin, i.e., a high polymer composite material such as CFRP or the like. Where the arms of links of an articulated mechanism are made of such a composite material, the articulations of the mechanism which are interconnected by the links are made of a metal material such as aluminum, for example, which is highly durable and allows an actuator such as an electric motor or a hydraulic motor to be mounted easily therein. Various efforts have been made to connect a metal material and a composite material suitably to each other. One problem which is frequently encountered with the joining of such two different materials is that the coefficients of thermal expansion of the materials are largely different from each other. More specifically, the composite material needs to be treated at a high temperature when it is shaped for connection to the metal material. When the composite material is cooled down to a stable point, since its coefficient of thermal expansion is different from that of the metal material, excessive residual stresses are developed in the composite material, with the results that the manufactured components have low mechanical strength and durability.

Where the articulated links are actuated under hydraulic or pneumatic pressure, the internal space of one of such links may be employed as an auxiliary gas chamber for an accumulator, which chamber stores the pressure of a high-pressure gas. In such a case, the high gas pressure in the link is applied to joints at the opposite ends of the link, thus tending to deform the composite material of the link. Inasmuch as the composite material has a relatively low modulus of elasticity, it is elastically deformed to a larger extent than the metal material, and may be destroyed at the joints of the link.

High-pressure containers include a spherical container such as a large-size gas tank and a cylindrical container such as a gas cylinder for home use or a cylinder of compressed air for use as an aqua lung. The latter cylindrical container is disclosed in Japanese Laid-Open Patent Publication No. 57-101195, for example.

The spherical container is large in size though the wall thereof is subject to small stresses and may be made of a lightweight and thin material. For this reason, many high-pressure containers are cylindrical in shape.

Where the material of a cylindrical container is isotropic, stresses produced in the container wall under the pressure of a high-pressure gas filled in the container are larger in the circumferential direction than in the axial direction. Specifically, the circumferential stresses are about twice the axial stresses. The reason for this is given below. When an internal pressure P is applied to a cylindrical container having an inside diameter of d and a wall thickness of t, a fluid force Fl acting in the axial direction of the container is expressed by:

$$F1 = (\pi d^2) \times P/4 \qquad [kg]$$

By dividing this by the cross-sectional area $S1 = \pi dt$ of the cylinder, a stress pl (in the axial direction) is given by:

$$\rho 1 = dP/4t \qquad [kg/cm^2]$$

Assuming that the container has a length L, a fluid force F2 tending to tear the cylindrical container apart in the circumferential direction is expressed as follows:

$$F2 = dLP \qquad [kg]$$

and the cross-sectional area, in the direction of the thickness, of the wall of the container for resisting the force F2 becomes:

$$S2 = 2 \times Lt \qquad [cm^2]$$

A circumferential stress p2 is thus given by:

$$p2 = F2/S2 = dP/2t = 2\rho 1$$

Therefore, the circumferential stress is twice as large as the axial stress. This fact derives from the fact that the material of the container is isotropic. The high-pressure containers, particularly gas containers for home use, should preferably be lightweight. Attempts are being made to construct such containers from a fiber-reinforced synthetic resin or a composite material made primarily of a high polymer material. A better approach to the use of such a composite material in a high-pressure container is being sought.

It is known that the fibers of a composite material of a high-pressure container should be wound at an angle of 54.75 degrees with respect to the axis of the container. The composite material fibers are wound at such an angle in uniform directions by the filament winding process.

The reason why the fibers should be wound at 54.75 degrees will be described briefly with reference to FIGS. 7A, 7B, and 7C which show a relatively long cylindrical container.

Considering the balancing of forces in the circumferential direction, a cross-sectional area perpendicular to the direction of all fibers passing through a plane ab is given by:

$$S = (2\pi r \cdot \cos\theta) t \qquad [cm^2]$$

Assuming that the stress imposed on the fibers is indicated by $\rho$, a force F applied in the direction of the fibers is expressed as follows:

$$F = \rho t(2\pi r \cdot \cos\theta) \qquad [kg](1)$$

Therefore, a force FC applied in the circumferential direction becomes:

$$FC = 2\rho t(2\pi r \cdot \cos\theta) \sin\theta \qquad [kg](2)$$

As shown in FIG. 7C, a force FCP produced by an internal pressure P in the cylinder is:

$$FCP = 2rP \cdot 2\pi r \cdot \cot\theta \; [kg] \qquad (3)$$

Since FC = FCP because these forces are balanced, the equations (2) and (3) are equal to each other, and the following equation is derived:

$$P = \rho t \cdot \sin^2\theta / r \qquad [kg/cm^2](4)$$

With respect to the balancing of forces in the axial direction, a force FA acting on the plane ab or a plane cd is given, as shown in FIG. 7b, as follows:

$$FA = \rho t(2\pi r \cos\theta)\cos\theta \qquad [kg](5)$$

A force FAP generated in the axial direction by the internal pressure P is expressed by:

$$FAP = \pi r^2 P \qquad [kg](6)$$

The equations (5) and (6) are equal to each other since they are balanced, and the following equation results:

$$P = 2\rho t \cdot \cos^2\theta \qquad [kg](7)$$

Since P in the equation (4) and P in the equation (7) are the same, these equations are equal to each other, thus obtaining:

$$\tan^2\theta = 2$$

Therefore, $\theta = 54.75$ degrees.

If a high-pressure container is to be of a smooth cylindrical shape without any projections, presenting no obstacle to the filament winding process, then a highly durable container can be manufactured since a long continuous filament is employed. If a high-pressure container having bulging axially opposite ends is to be manufactured, however, such a container configuration prevents the filament winding process from being relied upon in producing the container.

SUMMARY OF THE INVENTION

It is an object of the present invention to provide a hydraulic pressure system including a small-size accumulator having improved pressure characteristics.

Another object of the present invention is to provide a hydraulic pressure system having an articulated mechanism having a link structure by which a metal material and a composite material are reliably coupled to each other.

Still another object of the present invention is to provide a hydraulic pressure system including an articulated mechanism having a link structure capable of withstanding internal stresses developed therein when a high-pressure gas is filled in the link structure.

Yet another object of the present invention is to provide a hydraulic pressure system including a high-pressure container which is lightweight by being made of a composite material and composed of composite material fibers that have a circumferential density which is twice an axial density so as to be more lightweight, durable, and inexpensive.

A still further object of the present invention is to provide a hydraulic pressure system including a high-pressure container which can be made of a composite material even if the container is of a shape not suitable for the use of the filament winding process in manufacturing the container, and which can be manufactured more easily and less expensively than if the filament winding process were relied upon.

According to the present invention, there is provided a hydraulic pressure system for supplying a fluid under pressure, comprising a fluid pressure source for supplying the fluid pressure, an accumulator for storing part of the fluid from the fluid pressure source, the accumulator having a gas chamber filled with a high-pressure gas for pressurizing the stored fluid, and a structural member having a hermetically sealed space held in fluid communication with the gas chamber.

The space in the structural member which is held in communication with the gas chamber of the accumulator increases the volume of the gas chamber, thus improving the pressure characteristics of the accumulator.

The structural member comprises a link of an articulated mechanism interconnecting articulations, the link comprising a high polymer composite material and a metal material and having smaller-diameter portions joined to the articulations, respectively.

Each of the articulations includes means for actuating the articulation with the fluid supplied under pressure from the fluid pressure and the accumulator, the link having means for introducing the fluid under pressure to act in the space in the structural member.

Since the portions of the link which are joined to the articulations are smaller in diameter, any thermal strain of those smaller-diameter portions is reduced to reduce the danger of a failure of the joints which would otherwise result from different coefficients of thermal expansion of the link and the articulations. The reduction in the diameter of the link portions joined to the articulations is also effective in lowering elastic strain to make the link more resistant to pressure when the high-pressure gas is filled in the link.

The composite material comprises a prepreg woven of weft threads extending parallel to an axis of the link and warp threads extending perpendicularly to the axis of the link, the warp threads being laid at a density which is substantially twice the density of the weft threads.

Because the density of the warp threads is about twice the density of the weft threads, the magnitude of any strain applied to the composite material remains the same in warp and weft directions. Accordingly, the link can serve as a high-pressure container which is lightweight, durable, and can be manufactured inexpensively.

Alternatively, the composite material comprises a prepreg woven of weft threads and warp threads which are inclined at about 54.75° with respect to an axis of the link.

The inclination of the warp and weft threads with respect to the link axis at the above angle allows the link to serve as a lightweight and durable high-pressure container. Since the link can be manufactured simply by winding the prepreg, it can be wound around a tube having projecting members on its opposite ends.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
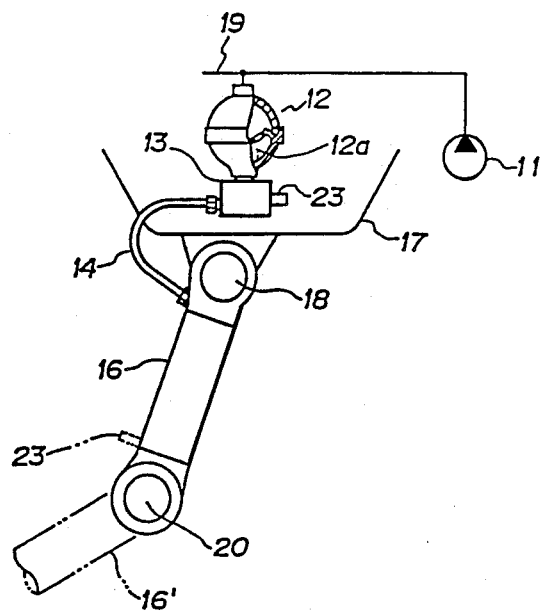
FIG. 1 is a schematic view of a hydraulic pressure system according to the present invention.

FIG. 1 shows a hydraulic pressure system according to the present invention which includes an oil pressure pump 11 connected to a controller (not shown) through an oil supply passage 19. The oil supply passage 19 is coupled to an accumulator 12 of the bladder type having a gas chamber 12a therein which is hydraulically connected to a rubber hose 14 through a base 13. The rubber hose 14 is connected to a high-pressure container described below. The high-pressure container is constructed as an arm or link 16 of an articulated mechanism of an industrial robot which is suspended from a ceiling (not shown) of a factory, for example. More specifically, a base 17 is attached to the ceiling, and the link 16 is angularly movably mounted on the base 17 through a first articulation 18 on one end of the link 16. The first articulation 18 has a hydraulically operated angular displacement motor or rotary actuator therein. Working oil is supplied under pressure selectively into pressure chambers in the piston of the motor for angularly moving the output shaft of the motor to turn the link 16 to a desired angular position. The working oil is supplied from the pump 11 and the accumulator 12 through the oil supply passage 19 and the controller. The other end of the link 16 is operatively coupled to a second arm or link 16' through a second articulation 20.

Figure 2:
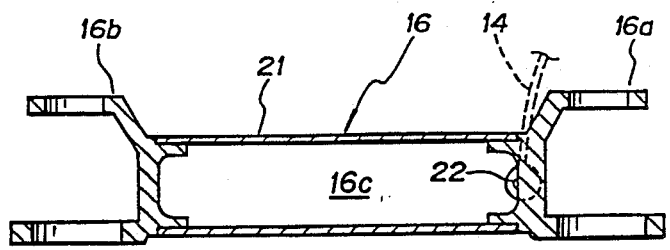
FIG. 2 is an enlarged cross-sectional view of a link of the hydraulic pressure system.
Figure 3:
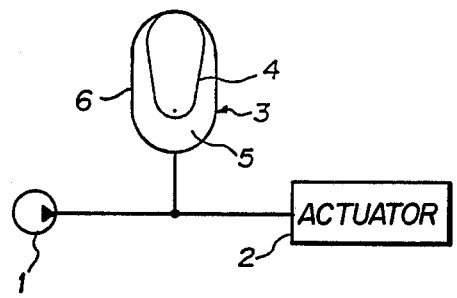
FIG. 3 is a schematic view of a conventional accumulator.
Figure 4:
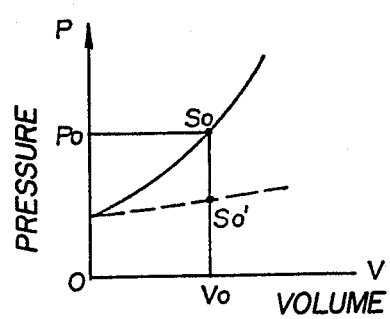
FIG. 4 is a graph showing the pressure vs. volume characteristics of accumulators.

The link 16 is illustrated in detail in FIG. 2. The link 16 has opposite ends shaped as yokes 16a, 16b supporting the first and second articulations 18, 20, respectively, and a hollow tube 21 of a circular cross section interconnecting the yokes 16a, 16b. The tube 21 and the yokes 16a, 16b are welded or brazed to each other to hermetically seal an internal space 16c in the tube 21. The righthand yoke 16a has a coupling port 22 connected to the rubber hose 14. The internal space 16c is held in communication with the gas chamber 12a of the accumulator 12 through the port 22 and the rubber hose 14.

It is assumed that a nitrogen gas is charged into the gas chamber 12a under an initial pressure of 70 kg/cm$^2$ through a gas filling valve 23 on the base 13. It is also assumed that the accumulator 12 has an overall volume of 300 cc, the volume of the space in the tube 21 is 600 cc, the volume of the space in the rubber hose 14 is neglected, and the maximum volume of oil that ca be stored in the accumulator 12 is 200 cc because of the design requirements of the hydraulic pressure system. If it were not for the volume 600 cc of the space in the tube 21, as is the case with the conventional arrangement, the pressure P in the gas chamber 12a after 200 cc of oil has been stored would be given by:

$$P = (70 \times 300) \div (300 - 200) = 210 \text{ kg/cm}^2$$

According to the present invention, the total space for storing the charged gas has a volume of 900 cc, and is reduced to a volume of 700 cc after 200 cc of oil has been stored in the accumulator 12. Therefore, the pressure P in the gas chamber 12a becomes:

$$P = (70 \times 900) \div (900 - 200) = 90 \text{ kg/cm}^2$$

Consequently, it can be understood that after the same volume of oil has been stored in the accumulator 12, the pressure in the gas chamber 12a coupled to the link space 16c according to the present invention is much smaller than would be if it were not for the high-pressure container of the present invention.

With the present invention, as described above, the pressure of oil stored in the accumulator 12 varies less with respect to the volume of the stored oil. The hydraulic pressure system is lightweight and compact. Since the maximum oil pressure level in the hydraulic pressure system is not unduly high, it can easily be controlled, and various devices hydraulically connected to the hydraulic pressure system become durable and reliable. The accumulator 12 may be small in size and hence the problem of leakage of the nitrogen gas from the accumulator 12 through the membrane can be reduced, though not completely eliminated.

The space 16c, or an auxiliary gas chamber of the accumulator 12, may be defined not only in a link of an industrial robot but also in any of various hollow structures of the hydraulic pressure system or other neighboring devices. Where one of the links of the articulated mechanism is utilized as the auxiliary gas chamber as illustrated, since the gas, the weight of which is negligibly small as compared with other components, is filled in the link, the inertial efficiency of the link is not lowered. Strictly, however, the weight of the link is slightly increased since its wall thickness is increased to make the link or high-pressure container resistant to pressure.

Where the accumulator 12 is positioned at a higher place near the ceiling of the factory, the gas filling valve 23 may not be connected to the base 13 but may be coupled to the link 16 as indicated by the imaginary lines in FIG. 1 for easier gas charging operation and maintenance.

Figure 5:
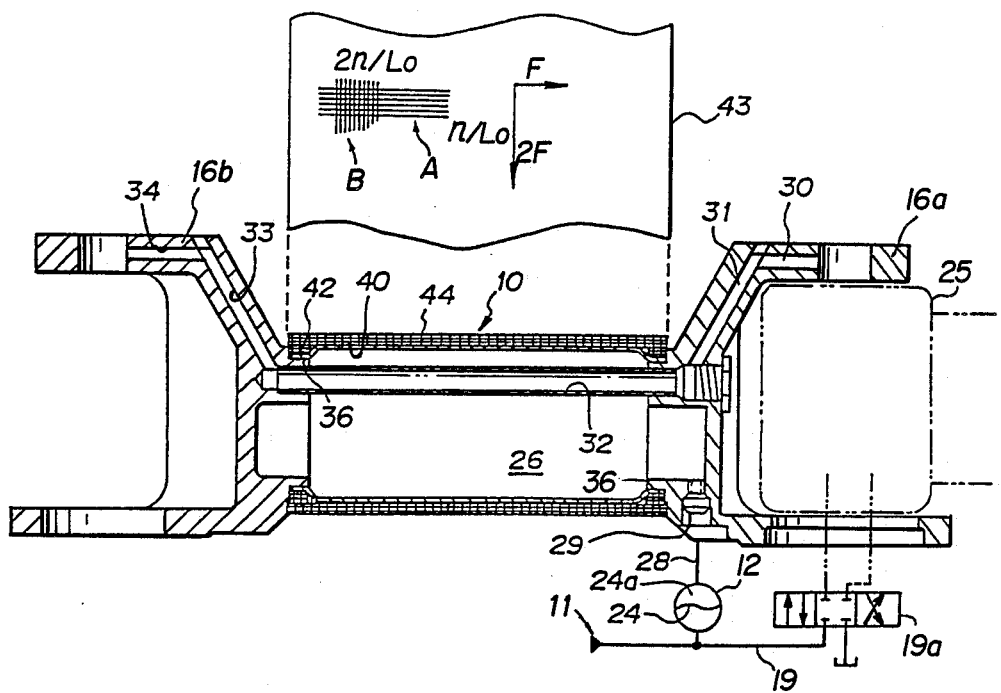
FIG. 5 is an enlarged cross-sectional view of a link of an articulated mechanism, such as of an industrial robot, for use in a hydraulic pressure system of the invention, the link being constructed as a high-pressure container.

FIG. 5 shows a link, which is constructed as a high-pressure container, of an articulated mechanism of an industrial robot or the like, the link being connected to a hydraulic pressure system similar to the hydraulic pressure system shown in FIG. 1. The link is of a hollow structure and is utilized as an auxiliary gas chamber of an accumulator of the hydraulic pressure system.

The link, generally denoted at 10, has yokes 16a, 16b of aluminum on its opposite ends supporting respective articulations of the articulated mechanism, and a central inner cylindrical tube 40 of aluminum or the like welded, brazed, bonded, or otherwise securely connected to the yokes 16a, 16b in a hermetically sealed relationship, the tube 40 being of a small wall thickness.

The tube 40 and the yokes 16a, 16b thus jointly define a sealed internal space 26. The internal space 26 serves an auxiliary gas chamber of an accumulator described later) for increasing the volume of the gas chamber of the accumulator to provide improved accumulator pressure characteristics. The link 10 is angularly movable by a hydraulically operated angular displacement motor or rotary actuator 25 disposed in the righthand yoke 16a. Oil under pressure is supplied to and discharged from the motor 25 through a directional control valve 19a. The directional control valve 19a is connected to an oil pressure pump 11 through an oil pressure passage 19 to which an accumulator 12 is connected through a branch passage for storing assistive oil pressure which will be supplied to the motor 25 to meet maximum oil pressure requirements. The accumulator 12 has a bladder membrane 24 defining, on its upper side (as shown), a gas chamber 24a filled with a nitrogen gas. The assistive oil pressure from the pump 11 is stored in an oil chamber defined below the membrane 24. The gas chamber 24a is held in fluid communication with the internal space 26 through an oil pressure passage 28 and a gas filling valve 29 mounted in the yoke 16a. Therefore, the nitrogen gas is filled in the gas chamber 24a and the internal space 26. The total volume of the gas chamber of the accumulator 12 is substantially the same as the sum of the volume of the gas chamber 24a and the internal space 26 to give the accumulator improved pressure characteristics. The oil supplied under pressure from the pressure passage 19 is also fed to another motor (not shown) for actuating an adjacent link through oil pressure passages 30, 31 defined in the yoke 16a in bypassing relation to the motor 25, an oil supply pipe 32 extending axially through the link 10, and oil pressure passages 33, 34 defined in the yoke 16a.

The pipe 32 may have a number of small holes defined in its wall, and may be covered with a expandable and contractable tube of rubber, so that oil flowing through the pipe 32 may enter between the pipe 32 and the rubber tube to store oil pressure energy. With the high-pressure gas filled in the internal space 26, the pipe 32 and the covering rubber tube jointly serve as an accumulator, with the rubber tube as a bladder. The pressure of the oil flowing through the pipe 32 is thus assisted by the pressure of the gas in the internal chamber 26.

The tube 40 has smaller-diameter portions 36 on its axially opposite ends which are surrounded by respective reinforcing members 42 of a composite material disposed respectively around the smaller-diameter tube portions 36 and including fibers wound in a direction normal to the longitudinal axis of the link 10. The reinforcing members 42 have the same outside diameter as the outside diameter of the inner tube 40, so that the outer circumferential surfaces of the reinforcing members 42 and the inner tube 40 lie flush with each other. The inner tube 40 and the reinforcing members 42 are surrounded by an outer tube 44 of a uniform thickness which is made of a composite material 43 to reinforce the inner tube 40 and the reinforcing members 42.

The reinforcing members 42 of the composite material are joined to the aluminum yokes 16a, 16b at the smaller-diameter portions 36 of the inner tube 40. Therefore, since the diameter of the reinforcing members 42 is relatively small, any thermal strain of the reinforcing members 42 is small. Inasmuch as the inner tube 40 defining the high-pressure gas chamber 26 therein is connected to the yokes 16a, 16b through the smaller-diameter portions 36, any internal stresses in the inner tube 40 produced by the pressure of the oil flowing through the pipe 32 and acting through the intermediary of the high-pressure gas in the chamber 26 are reduced in proportion to the square of the diameter of the smaller-diameter portions 36. The reinforcing members 42 are wound around the smaller-diameter portions 36 to the same outside diameter as that of the inner tube 40. Therefore, the composite material 43 can neatly be wound around the reinforcing members 42 and the inner tube 40 without irregularities.

While the reinforcing members 42 have been described as being made of a composite material 43, they may be the same metal as that of the yokes 16a, 16b and may be brazed to the yokes 16a, 16b.

The composite material 43 making up the outer tube 44 is in the form of a mat, known as a "prepreg", of woven reinforcing fibers. In the embodiment shown in FIG. 5, the prepreg is woven such that warp threads B have a density which is twice that of weft threads A. More specifically, the weft threads A extending parallel to the axis of the link 10 have a density of n threads per unit length L0, whereas the warp threads B extending perpendicularly to the axis of the link 10 have a density of 2n threads per unit length L0. Therefore, these warp and weft threads or fibers B, A have respective mechanical strengths to withstand the circumferential and axial forces 2F, F which are applied to the composite material 43 under the internal pressure P generated by the gas in the chamber 26 and acting on the tubes 40, 44. The stresses developed in the composite material 43 are therefore equal in the warp and weft directions. The composite material 43 is light in weight, highly resistant to pressure, and can be manufactured while saving material.

Figure 6:
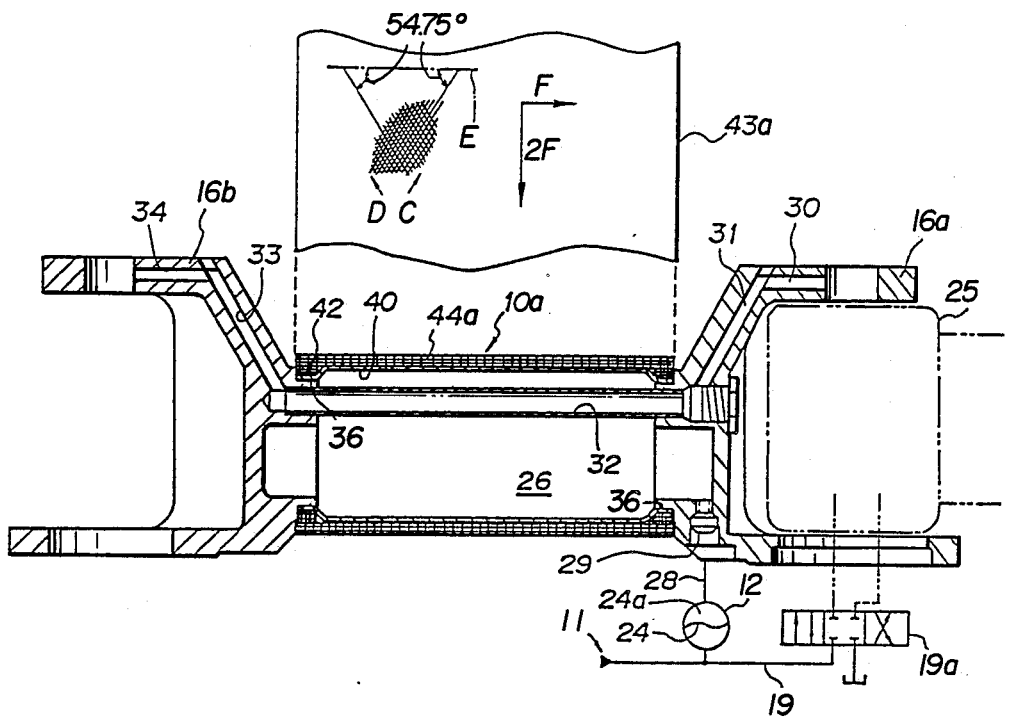
FIG. 6 is an enlarged cross-sectional view of a link according to another embodiment of the present invention.
Figure 7A:
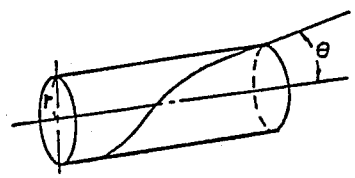
FIGS. 7A, 7B, and 7C are views illustrating the theoretical basis for the link shown in FIG. 6.
Figure 7B:
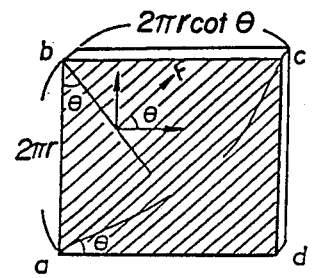
Figure 7C:
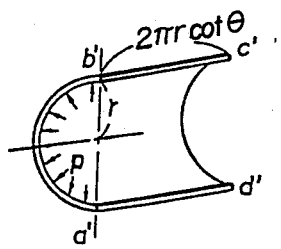

FIG. 6 shows a link 10a according to another embodiment of the present invention. The link 10a and its associated hydraulic pressure supply arrangement are substantially the same as those shown in FIG. 5, except that an outer tube 44a is made of a composite material or prepreg 43a which is woven of warp and weft threads D, C extending at an angle of about 54.75 degrees with respect to the axis of the link 10a. More specifically, the warp threads D run in a direction which is inclined at an included angle of 54.75° to the link axis E, and similarly the weft threads C run in a direction which is inclined at an included angle of 54.75° to the link axis E. To manufacture the link 10a, the prepreg 43 is carefully woven to keep the warp and weft threads D, C at the indicated angle with respect to the link axis.

Since the fibers of the composite material 43a are laid at the desired angle of 54.75°, the link 10a is lightweight and pressure-resistant for use as a high-pressure container. The composite material 43 can neatly be wound around the inner tube 40 and the reinforcing members 42 even with the yokes 16a, 16b projecting radially.

The angle at which the warp and weft threads extend across the link axis has been described as being 54.75°. However, it may not necessarily be exactly 54.75°, but may be of a value close to 54.75°.

The composite material or prepreg 43 has a width which is shown as being the same as the length of the inner tube 40. However, a narrower ribbon or band of prepreg ma be helically wound around the inner tube 40. The link 10, 10a have been illustrated as comprising the inner tube 40, the reinforcing members 42, and the outer tube 44, 44a, but are not limited to the illustrated structure and configuration. The opposite ends of the inner tube 40 may not be smaller in diameter. The inner tube 40 and the yokes 16a, 16b may be joined to each other in any of various known ways other than described above.

Although certain preferred embodiments have been shown and described, it should be understood that many changes and modifications may be made therein without departing from the scope of the appended claims.

What is claimed is:

1. A hydraulic pressure system for supplying a fluid under pressure, comprising:
   a fluid pressure source for supplying the fluid pressure;
   an accumulator for storing part of the fluid from said fluid pressure source, said accumulator having a gas chamber filled with a high-pressure gas for pressurizing the stored fluid; and
   a structural member having a hermetically sealed space held in fluid communication with said gas chamber, said structural member comprising a link of an articulated mechanism and including a cylindrical metal tube extending between and connection yokes.

2. A hydraulic pressure system for supplying a fluid under pressure, comprising:
   a fluid pressure source for supplying the fluid pressure;
   an accumulator for storing part of the fluid from said fluid pressure source, said accumulator having a gas chamber filled with a high-pressure gas for pressurizing the stored fluid; and
   a structural member having a hermetically sealed spaced held in fluid communication with said gas chamber, wherein said structural member comprises a link of an articulated mechanism interconnecting articulations, said link comprising a high polymer composite material and a metal material and having smaller-diameter portions joined to said articulations, respectively.

3. A hydraulic pressure system according to claim 2, wherein each of said articulation includes means for actuating the articulation with the fluid supplied under pressure from said fluid pressure source and said accumulator, said link having means for introducing the fluid under pressure to act in said space in said structural member.

4. A hydraulic pressure system according to claim 2, wherein said composite material comprises a prepreg woven of weft threads extending parallel to an axis of said link and warp threads extending perpendicularly to the axis of the link, said warp threads being laid at a density which is substantially twice the density of said weft threads.

5. A hydraulic pressure system according to claim 2, wherein said composite material comprises a prepreg woven of weft threads and warp threads which are inclined at about 54.75° with respect to an axis of said link.

* * * * *